US012293883B2

(12) United States Patent
Huang

(10) Patent No.: US 12,293,883 B2
(45) Date of Patent: May 6, 2025

(54) BACKLIGHT KEYSWITCH AND BACKLIGHT MODULE THEREOF

(71) Applicant: DARFON ELECTRONICS CORP., Taoyuan (TW)

(72) Inventor: Heng-Yi Huang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 181 days.

(21) Appl. No.: 18/128,240

(22) Filed: Mar. 30, 2023

(65) Prior Publication Data

US 2023/0317386 A1 Oct. 5, 2023

Related U.S. Application Data

(60) Provisional application No. 63/325,623, filed on Mar. 31, 2022.

(30) Foreign Application Priority Data

Mar. 16, 2023 (TW) ................................ 112109798

(51) Int. Cl.
*H01H 13/83* (2006.01)

(52) U.S. Cl.
CPC ......... *H01H 13/83* (2013.01); *H01H 2219/06* (2013.01); *H01H 2219/062* (2013.01); *H01H 2219/064* (2013.01)

(58) Field of Classification Search
CPC .... H01H 13/83; H01H 13/702; H01H 13/704; H01H 13/705; H01H 3/125;
(Continued)

(56) References Cited

U.S. PATENT DOCUMENTS 6,743,993 B1 6/2004 Clark
7,154,059 B2 * 12/2006 Chou .................. H01H 13/702 200/341
(Continued)

FOREIGN PATENT DOCUMENTS

CN 204472037 * 7/2015 ............ B32B 27/32
CN 106783308 A 5/2017
(Continued)

OTHER PUBLICATIONS

Translation of CN204472037 (Original document published Jul. 15, 2015) (Year: 2015).*
(Continued)

*Primary Examiner* — William A Bolton
(74) *Attorney, Agent, or Firm* — Winston Hsu

(57) ABSTRACT

A backlight keyswitch includes a keyswitch body, a board connected to the keyswitch body, a backlight module and a membrane disposed between the keyswitch body and the board. The backlight module is disposed under the board and includes a backlight circuit board, a light-blocking sheet, a first reflecting ink layer, and a light guide plate disposed between the light-blocking sheet and the backlight circuit board. The first reflecting ink layer is formed on the light-blocking sheet and located above the backlight circuit board, for at least partially reflecting light emitted by the backlight circuit board back to an optical microstructure in the light guide plate to prevent center symbols of the keyswitch body from being too bright, such that light can be incident to the keyswitch body via scattering of the optical microstructure to increase brightness of side symbols of the keyswitch body.

38 Claims, 6 Drawing Sheets

(58) Field of Classification Search
CPC ......... H01H 2219/06; H01H 2219/062; H01H 2219/064; H01H 2219/056; G06F 3/02
USPC ................................. 200/314, 344, 310, 5 A
See application file for complete search history.

(56) References Cited

U.S. PATENT DOCUMENTS

| | | | | |
|---|---|---|---|---|
| 7,235,752 | B1 * | 6/2007 | Chen | H01H 13/83 200/310 |
| 7,525,056 | B2 * | 4/2009 | Chiba | H01H 13/83 200/314 |
| 8,770,772 | B1 * | 7/2014 | Zhang | H01H 13/83 362/23.03 |
| 8,835,785 | B2 * | 9/2014 | Yamada | H01H 13/83 200/344 |
| 9,040,856 | B2 | 5/2015 | Chen | |
| 9,214,301 | B2 | 12/2015 | Chen | |
| 9,299,515 | B2 | 3/2016 | Chen | |
| 10,276,327 | B2 | 4/2019 | Chen | |
| 10,586,664 | B2 | 3/2020 | Yeh | |
| 11,036,306 | B2 | 6/2021 | Cheng | |
| 11,170,950 | B2 | 11/2021 | Liang | |
| 11,257,638 | B2 | 2/2022 | Liang | |
| 11,371,676 | B2 | 6/2022 | Huang | |
| 11,409,373 | B2 | 8/2022 | Cheng | |
| 11,443,907 | B2 | 9/2022 | Ho | |
| 11,515,107 | B2 | 11/2022 | Chen | |
| 11,538,641 | B2 | 12/2022 | Liang | |
| 2002/0125118 | A1 * | 9/2002 | Douzono | G06F 3/0202 200/314 |
| 2004/0174339 | A1 * | 9/2004 | Liao | H01H 3/125 345/167 |
| 2006/0290676 | A1 * | 12/2006 | Harada | G06F 3/0202 345/168 |
| 2010/0018845 | A1 * | 1/2010 | Lin | G02B 6/0073 362/296.01 |
| 2011/0037730 | A1 | 2/2011 | Wang | |
| 2011/0278147 | A1 * | 11/2011 | Lee | H01H 13/83 200/310 |
| 2017/0352504 | A1 | 12/2017 | Chen | |
| 2019/0013163 | A1 * | 1/2019 | Chen | H01H 13/7065 |
| 2019/0027326 | A1 | 1/2019 | Tsai | |
| 2019/0369744 | A1 | 12/2019 | Wu | |
| 2020/0402748 | A1 | 12/2020 | Cheng | |
| 2022/0406977 | A1 | 12/2022 | Ho | |

FOREIGN PATENT DOCUMENTS

| | | | |
|---|---|---|---|
| CN | 110335775 | A | 10/2019 |
| CN | 110880456 | A | 3/2020 |
| CN | 113632249 | A | 11/2021 |
| JP | 2019-139728 | | 8/2019 |
| TW | M334393 | | 6/2008 |
| TW | M395202 | U1 | 12/2010 |
| TW | I527075 | B | 3/2016 |
| TW | I604484 | B | 11/2017 |
| TW | 201824318 | A | 7/2018 |
| TW | I632577 | B | 8/2018 |
| TW | I725894 | | 4/2021 |
| TW | I760181 | B | 4/2022 |

OTHER PUBLICATIONS

Huang, the specification, including the claims, and drawings in the U.S. Appl. No. 18/127,667, filed Mar. 29, 2023.
Liu, the specification, including the claims, and drawings in the U.S. Appl. No. 18/297,020, filed Apr. 7, 2023.
Liu, the specification, including the claims, and drawings in the U.S. Appl. No. 18/128,235, filed Mar. 30, 2023.
Chen, the specification, including the claims, and drawings in the U.S. Appl. No. 18/128,261, filed Mar. 30, 2023.
Huang, the specification, including the claims, and drawings in the U.S. Appl. No. 18/330,342, filed Jun. 6, 2023.

* cited by examiner

BACKLIGHT KEYSWITCH AND BACKLIGHT MODULE THEREOF

CROSS REFERENCE TO RELATED APPLICATION

This application claims the benefit of U.S. Provisional Application No. 63/325,623, filed on Mar. 31, 2022. The content of the application is incorporated herein by reference.

BACKGROUND OF THE INVENTION

1. Field of the Invention

The present invention relates to a backlight keyswitch and a backlight module thereof, and more specifically, to a backlight keyswitch utilizing a reflecting ink layer to reflect at least partial light emitted upward by a backlight source back to a light guide plate and a backlight module thereof.

2. Description of the Prior Art

In general, a backlight module of a backlight keyboard includes a light guide plate and a backlight source. A board of the backlight keyboard is disposed on the light guide plate and has hole regions formed corresponding to a plurality of backlight keyswitches of the backlight keyboard. The light guide plate has an optical microstructure formed corresponding to each hole region for guiding light to be incident to symbols on the backlight keyswitch through the hole region, so as to generate the symbol lighting effect.

A conventional backlight design involves disposing a backlight circuit board, which has a plurality of light emitting diodes corresponding to the plurality of backlight keyswitches, under the board. As such, the light emitting diode can emit light to the symbols on a keycap of the backlight keyswitch for generating the symbol lighting effect. However, since light emitted upward by the light emitting diode would be incident to the backlight keyswitch directly, it may cause the problem that center symbols on the keyswitch are too bright but side symbols on the keyswitch are not bright enough, so as to influence the brightness uniformity and the symbol lighting effect of the backlight keyswitch.

SUMMARY OF THE INVENTION

Therefore, one objective of the present invention is to provide a backlight keyswitch utilizing a reflecting ink layer to reflect at least partial light emitted upward by a backlight source back to a light guide plate and a backlight module thereof to solve the aforesaid problems.

According to an embodiment, a backlight keyswitch of the present invention includes a keyswitch body, a board, a membrane circuit board, and a backlight module. The board is disposed under the keyswitch body and connected to the keyswitch body to make the keyswitch body movable relative to the board. The board has at least one hole region corresponding to the keyswitch body. The membrane circuit board is disposed between the keyswitch body and the board. The backlight module is disposed under the board. The backlight module includes a light guide plate, a backlight circuit board, a light-blocking sheet, and a first reflecting ink layer. The light guide plate has a containing hole corresponding to the keyswitch body and has an optical microstructure corresponding to at least one hole region. The backlight circuit board is disposed under the light guide plate and has a backlight source disposed in the containing hole. The light-blocking sheet is disposed between the board and the light guide plate and has a light-permeable region corresponding to the keyswitch body. The first reflecting ink layer is formed on one of the board, the membrane circuit board, and the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body.

According to another embodiment, a backlight module of the present invention is applied to a backlight keyswitch. The backlight keyswitch has a keyswitch body, a board, and a membrane circuit board. The board is disposed under the keyswitch body and connected to the keyswitch body to make the keyswitch body movable relative to the board. The board has at least one hole region corresponding to the keyswitch body. The membrane circuit board is disposed between the keyswitch body and the board. The backlight module includes a light guide plate, a backlight circuit board, a light-blocking sheet, and a first reflecting ink layer. The light guide plate has a containing hole corresponding to the keyswitch body and has an optical microstructure corresponding to at least one hole region. The backlight circuit board is disposed under the light guide plate and has a backlight source disposed in the containing hole. The light-blocking sheet is disposed between the board and the light guide plate and has a light-permeable region. The first reflecting ink layer is formed on one of the board, the membrane circuit board, and the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body.

In summary, the present invention adopts the light guide design in which the reflecting ink layer is disposed above the backlight source to reflect at least partial light emitted upward by the backlight source back to the light guide plate (for preventing the center symbols from being too bright) and the light can be incident to the keyswitch body via scattering of the optical microstructure in the light guide plate (for increasing the brightness of the side symbols), for solving the prior art problem that the center symbols are too bright but the side symbols are not bright enough when light emitted upward by the light emitting diode is incident to the backlight keyswitch directly. In such a manner, the brightness uniformity and the symbol lighting effect of the backlight keyswitch can be improved greatly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
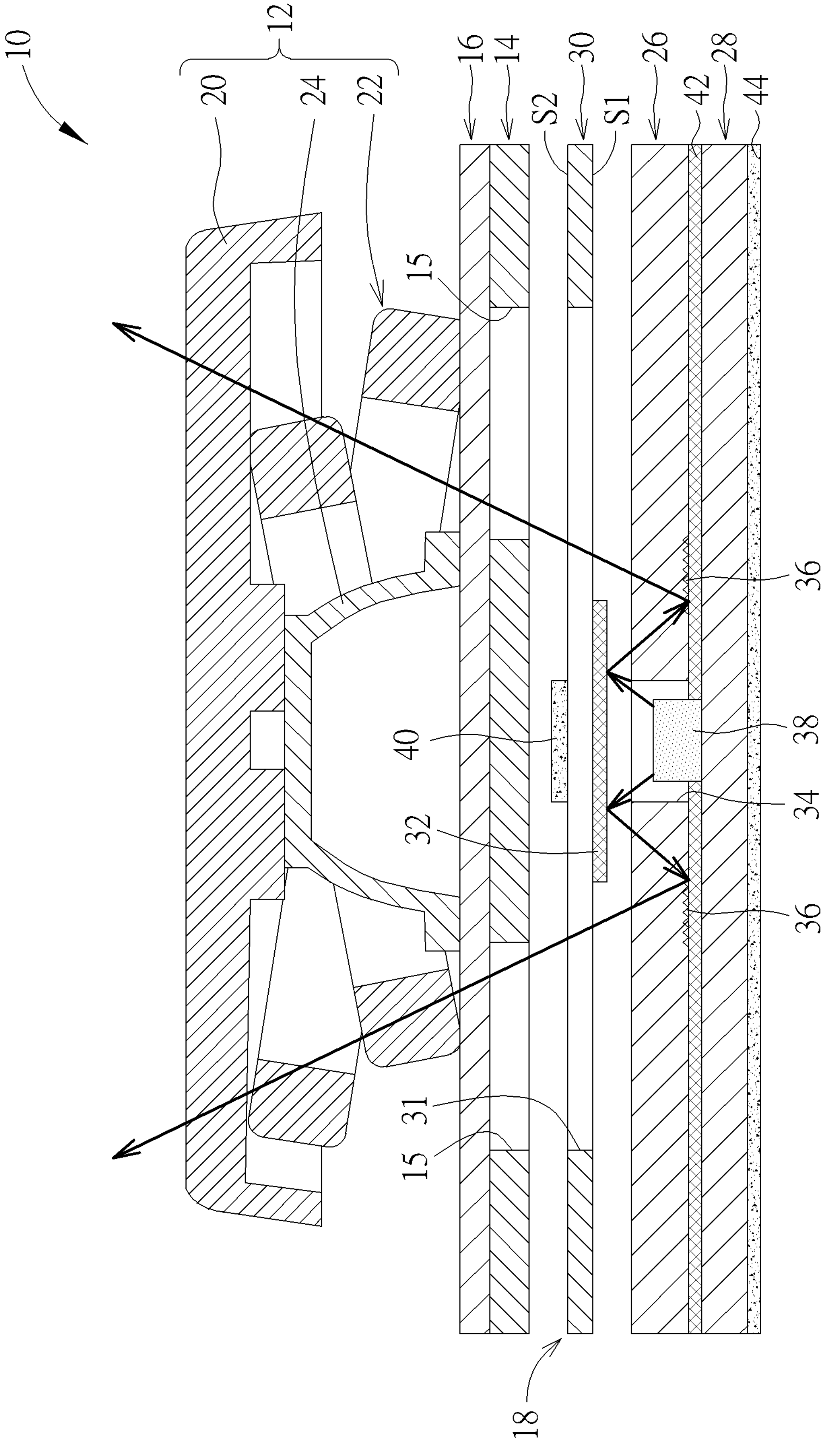
FIG. 1 is a cross-sectional diagram of a backlight keyswitch according to an embodiment of the present invention.

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to scale and the configuration of each component (e.g., a size ratio of ink layers) in the drawings is merely illustrative, not presenting an actual condition of the embodiments.

Please refer to FIG. 1, which is a cross-sectional diagram of a backlight keyswitch 10 according to an embodiment of the present invention. The backlight keyswitch 10 could be preferably applied to a foldable electronic apparatus composed of an upper cover and a lower casing or an electronic apparatus having a keyswitch input function (e.g., a notebook or a keyboard device, but not limited thereto). The backlight keyswitch 10 can provide a symbol lighting function such that a user can press it conveniently to perform a desired input function. As shown in FIG. 1, the backlight keyswitch 10 includes a keyswitch body 12, a board 14, a membrane circuit board 16, and a backlight module 18. The board 14 is disposed under the keyswitch body 12 and connected to the keyswitch body 12 to make the keyswitch body 12 movable relative to the board 14. The board 14 has at least one hole region 15 (two shown in FIG. 1, but not limited thereto), and the membrane circuit board 16 is disposed between the keyswitch body 12 and the board 14. As for the related description for components of the keyswitch body 12, it is commonly seen in the prior art. For example, the keyswitch body 12 could include a keycap 20, a lifting mechanism 22, and an elastic returning member 24 (but not limited thereto). The membrane circuit board 16 has a switch, and the keycap 20 is connected to the lifting mechanism 22. The lifting mechanism 22 is movably disposed on the board 14 for supporting the keycap 20 to move close to or away from the switch. The elastic force provided by the elastic returning member 24 when the elastic returning member 24 is pressed can return the keycap 20 to its original position for a user to perform the subsequent pressing operations.

More detailed description for the backlight module 18 is provided as follows. The backlight module 18 is disposed under the board 14 and includes a light guide plate 26, a backlight circuit board 28, a light-blocking sheet 30, and a first reflecting ink layer 32. The light guide plate 26 has a containing hole 34 corresponding to the keyswitch body 12 and has an optical microstructure 36 corresponding to the hole region 15. The backlight circuit board 28 is disposed under the light guide plate 26 and has a backlight source 38. The backlight source 38 (preferably a light emitting diode, but not limited thereto) is disposed in the containing hole 34. The light-blocking sheet 30 is disposed between the board 14 and the light guide plate 26 and has a light-permeable region 31 corresponding to the keyswitch body 12. The first reflecting ink layer 32 could be preferably a white ink layer (but not limited thereto) and formed on the light-blocking sheet 30. The first reflecting ink layer 32 is located above the backlight source 38. To be more specific, in this embodiment, as shown in FIG. 1, the first reflecting ink layer 32 could be formed on a lower surface S1 of the light-blocking sheet 30. In the practical application, for preventing light from partially passing through the first reflecting ink layer 32 to be incident upward to the keyswitch body 12, the backlight module 18 could further include an opaque ink layer 40 to solve the prior art problem that the center symbols are too bright. The opaque ink layer 40 could be preferably a black ink layer (but not limited thereto) and formed on an upper surface S2 of the light-blocking sheet 30 for preventing light passing through the first reflecting ink layer 32 from being directly incident to the keyswitch body 12.

Via the aforesaid configuration, the first reflecting ink layer 32 can reflect at least partial light emitted upward by the backlight source 38 back to the optical microstructure 36 of the light guide plate 26 (as shown in FIG. 1). Accordingly, light in the light guide plate 26 can pass through the light-permeable region 31 of the light-blocking sheet 30, the hole region 15 of the board 14 and the membrane circuit board 16 to be incident to the keyswitch body 12, so as to generate the symbol lighting effect.

To be noted, the aforesaid ink layer configuration could be also applied to the backlight circuit board 28. For example, as shown in FIG. 1, the backlight module 18 could further include a second reflecting ink layer 42 and an opaque ink layer 44. The second reflecting ink layer 42 (preferably a white ink layer, but not limited thereto) is formed on the backlight circuit board 28 for reflecting light emitted downward out of the light guide plate 26 back to the light guide plate 26, and the opaque ink layer 44 (preferably a black ink layer, but not limited thereto) is formed under the backlight circuit board 28 for preventing light from passing through the backlight circuit board 28. As such, the light usage efficiency of the backlight source 38 for the light guide plate 26 can be further improved.

In summary, the present invention adopts the light guide design in which the reflecting ink layer is disposed above the backlight source to reflect at least partial light emitted upward by the backlight source back to the light guide plate (for preventing the center symbols from being too bright) and the light can be incident to the keyswitch body via scattering of the optical microstructure in the light guide plate (for increasing the brightness of the side symbols), for solving the prior art problem that the center symbols are too bright but the side symbols are not bright enough when light emitted upward by the light emitting diode is incident to the backlight keyswitch directly. In such a manner, the brightness uniformity and the symbol lighting effect of the backlight keyswitch can be improved greatly.

The ink layer configuration is not limited to the aforesaid embodiment, meaning that the present invention could adopt other ink layer stacking design and the size ratio relationship and the ink colors and types of the ink layers could vary with the practical lighting application of the backlight module 18.

Figure 2:
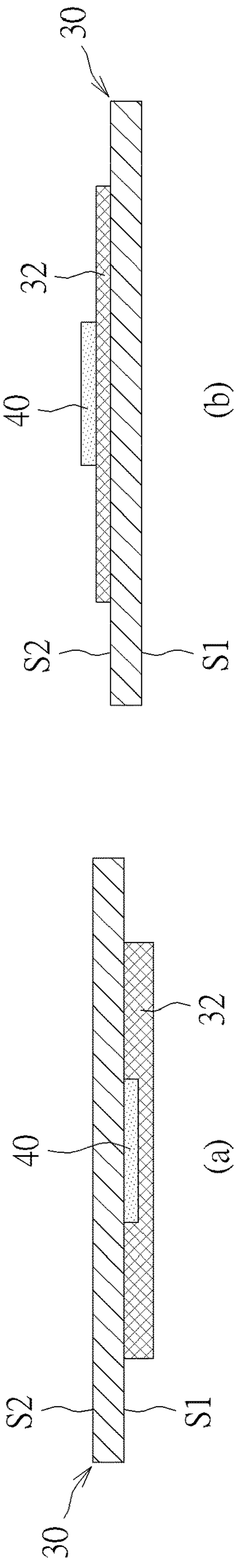
FIG. 2 is a diagram of different ink layer configurations according to different embodiments of the present invention.

For example, as shown in FIG. 2(*a*), the first reflecting ink layer 32 could be formed on the lower surface S1 of the light-blocking sheet 30 and the opaque ink layer 40 could be formed between the first reflecting ink layer 32 and the light-blocking sheet 30. As shown in FIG. 2(*b*), the first reflecting ink layer 32 could be formed on the upper surface S2 of the light-blocking sheet 30 and the opaque ink layer 40 could be formed on the first reflecting ink layer 32.

Figure 3:
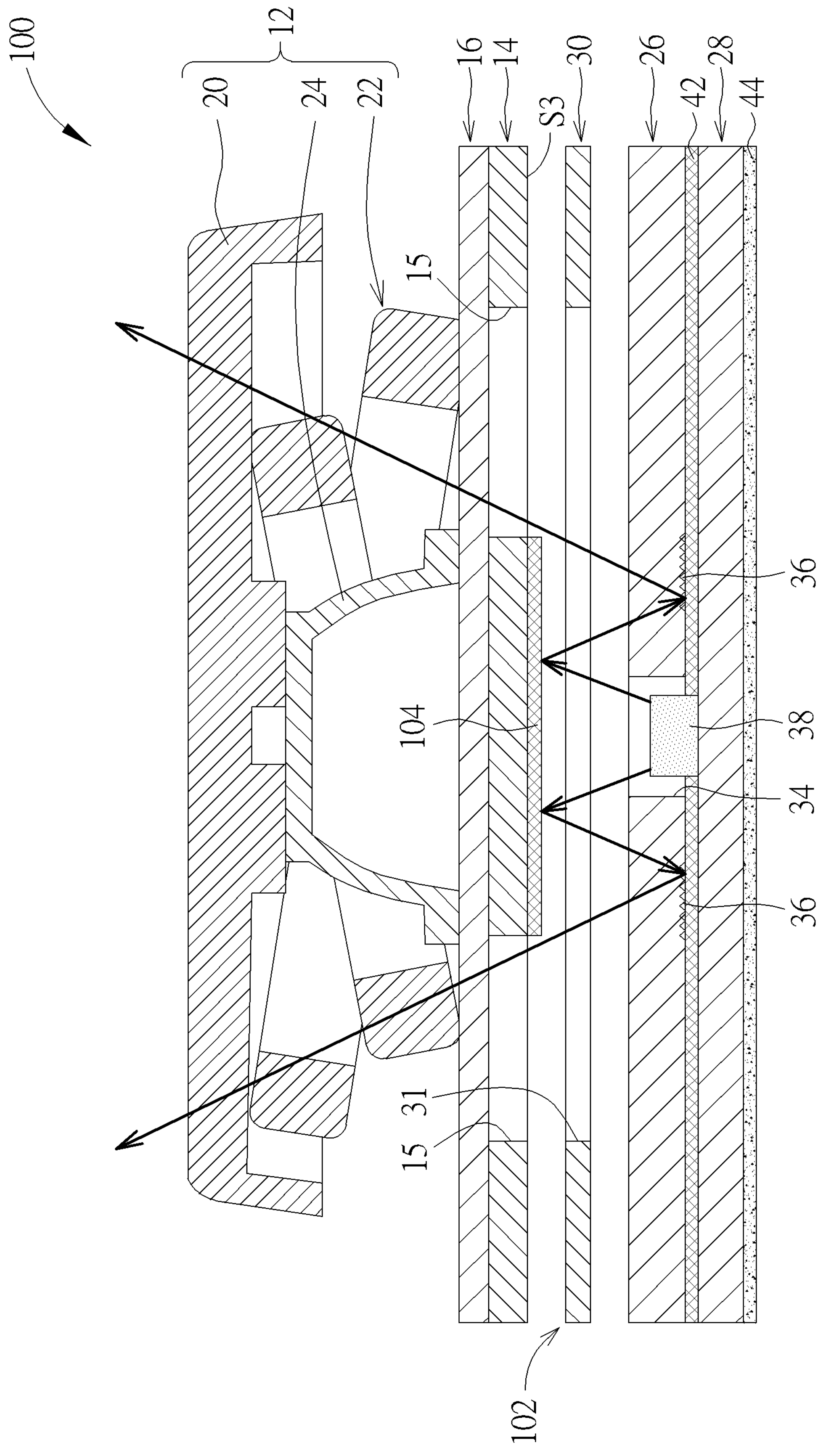
FIG. 3 is a cross-sectional diagram of a backlight keyswitch according to another embodiment of the present invention.

In addition, the forming position of the reflecting ink layer could be not limited to the aforesaid embodiments. For example, please refer to FIG. 3, which is a cross-sectional diagram of the backlight keyswitch 100 according to another embodiment of the present invention. Components both mentioned in this embodiment and the aforesaid embodiments represent components with similar structures or functions, and the related description is omitted herein. As shown in FIG. 3, the backlight keyswitch 100 includes the keyswitch body 12, the board 14, the membrane circuit board 16, and a backlight module 102. The backlight module 102 is disposed under the board 14 and includes the light guide plate 26, the backlight circuit board 28, the light-blocking sheet 30, the second reflecting ink layer 42, the opaque ink layer 44, and a first reflecting ink layer 104. In this embodiment, the first reflecting ink layer 104 could be preferably a white ink layer (but not limited thereto) and formed on a lower surface S3 of the board 14. In such a manner, as shown in FIG. 3, the first reflecting ink layer 104 can reflect at least partial light emitted upward by the backlight source 38 back to the optical microstructure 36 of the light guide plate 26. Accordingly, light in the light guide plate 26 can pass through the light-permeable region 31 of the light-blocking sheet 30, the hole region 15 of the board 14 and the membrane circuit board 16 sequentially via scattering of the optical microstructure 36 to be incident to the keyswitch body 12, so as to generate the symbol lighting effect.

Figure 4:
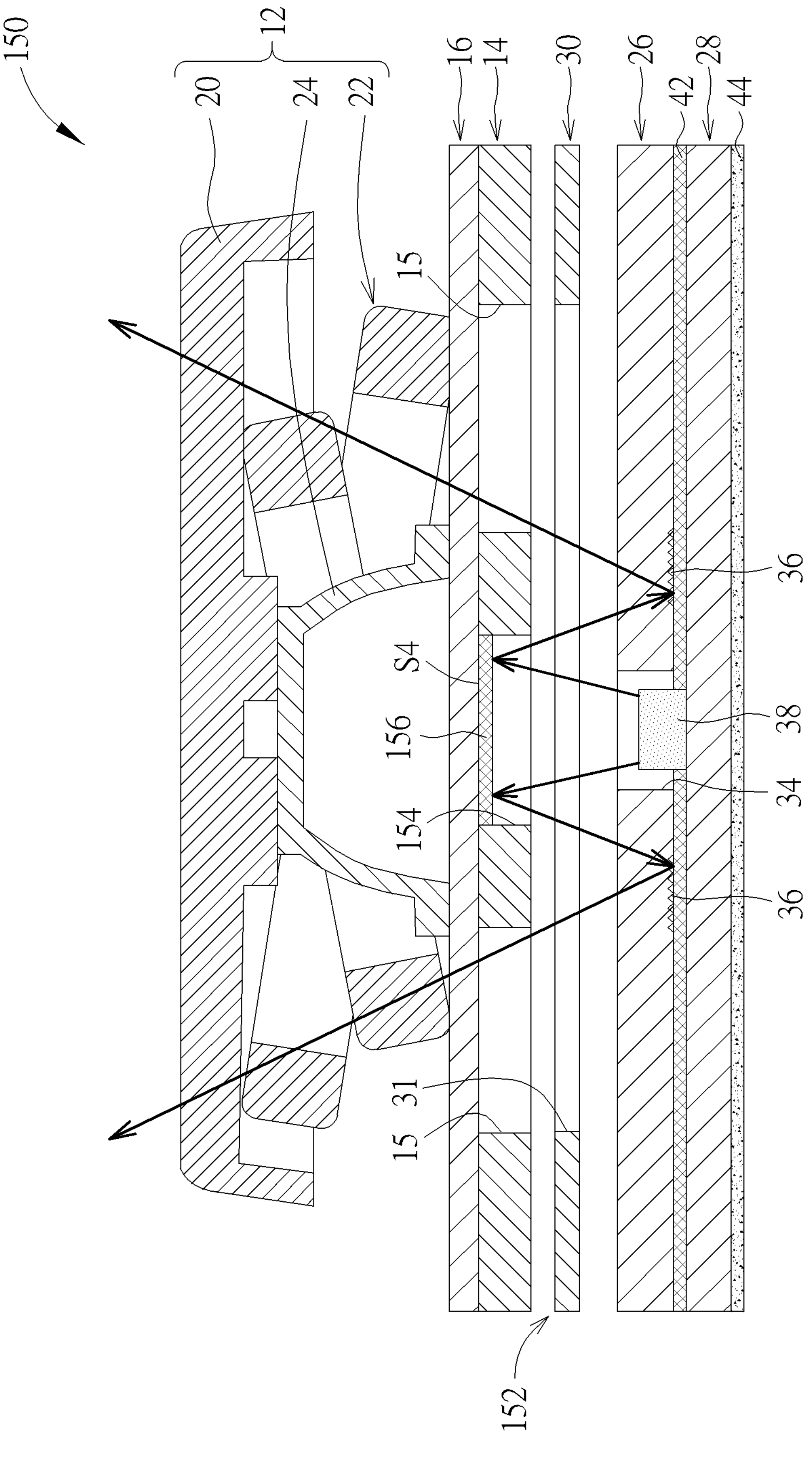
FIG. 4 is a cross-sectional diagram of a backlight keyswitch according to another embodiment of the present invention.

Furthermore, please refer to FIG. 4, which is a cross-sectional diagram of the backlight keyswitch 150 according to another embodiment of the present invention. Components both mentioned in this embodiment and the aforesaid embodiments represent components with similar structures or functions, and the related description is omitted herein. As shown in FIG. 4, the backlight keyswitch 150 includes the keyswitch body 12, the board 14, the membrane circuit board 16, and a backlight module 152. The board 14 could further have a center hole region 154. The backlight module 152 is disposed under the board 14 and includes the light guide plate 26, the backlight circuit board 28, the light-blocking sheet 30, the second reflecting ink layer 42, the opaque ink layer 44, and a first reflecting ink layer 156. In this embodiment, the first reflecting ink layer 156 could be preferably a white ink layer (but not limited thereto) and formed on a lower surface S4 of the membrane circuit board 16. In such a manner, as shown in FIG. 4, the first reflecting ink layer 156 can reflect at least partial light which is emitted upward by the backlight source 38 and then passes through the center hole region 154 back to the optical microstructure 36 of the light guide plate 26. Accordingly, light in the light guide plate 26 can pass through the light-permeable region 31 of the light-blocking sheet 30, the hole region 15 of the board 14 and the membrane circuit board 16 sequentially via scattering of the optical micro structure 36 to be incident to the keyswitch body 12, so as to generate the symbol lighting effect.

Figure 5:
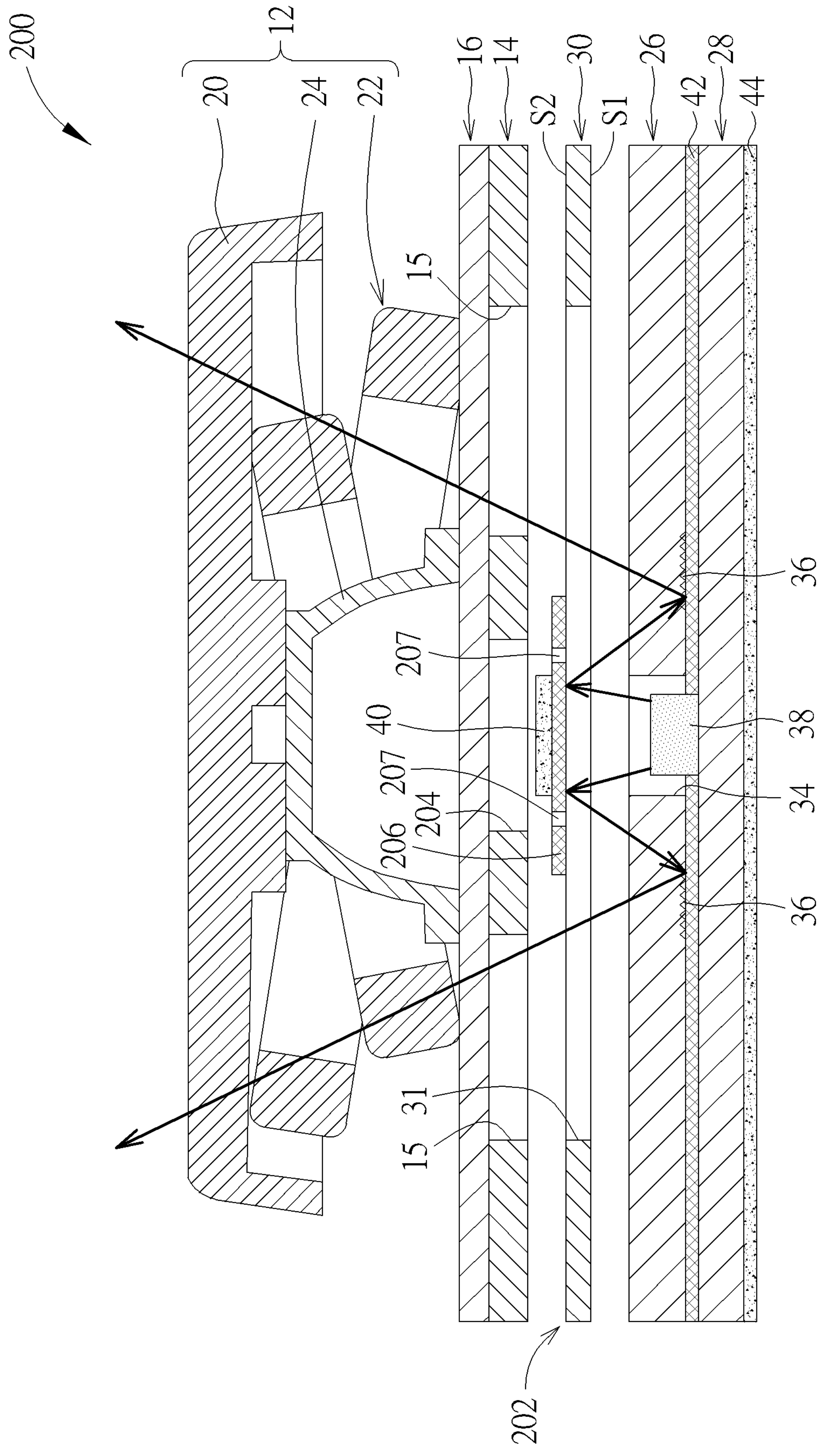
FIG. 5 is a cross-sectional diagram of a backlight keyswitch according to another embodiment of the present invention.

In the practical application, for avoiding the problem of insufficient brightness at a position of the keycap corresponding to the reflecting ink layer, the present invention could selectively adopt the light supplement hole design. For example, please refer to FIG. 5, which is a cross-sectional diagram of the backlight keyswitch 200 according to another embodiment of the present invention. Components both mentioned in this embodiment and the aforesaid embodiments represent components with similar structures or functions, and the related description is omitted herein. As shown in FIG. 5, the backlight keyswitch 200 includes the keyswitch body 12, the board 14, the membrane circuit board 16, and a backlight module 202. The board 14 could further have a center hole region 204. The backlight module 202 is disposed under the board 14 and includes the light guide plate 26, the backlight circuit board 28, the light-blocking sheet 30, the opaque ink layer 40, the second reflecting ink layer 42, the opaque ink layer 44, and a first reflecting ink layer 206. In this embodiment, the first reflecting ink layer 206 could be preferably a white ink layer (but not limited thereto). The first reflecting ink layer 206 is formed on the upper surface S2 of the light-blocking sheet 30 and has at least one light supplement hole 207 (two located at two sides of the opaque ink layer 40 respectively as shown in FIG. 5, but not limited thereto). Accordingly, in addition to reflecting at least partial light emitted upward by the backlight source 38 back to the light guide plate 26, the first reflecting ink layer 206 can also allow the light emitted upward by the backlight source 38 to be incident to the keyswitch body 12 through the light supplement hole 207, the center hole region 204, and the membrane circuit board 16, so as to further improve the brightness uniformity of the backlight keyswitch 200.

Figure 6:
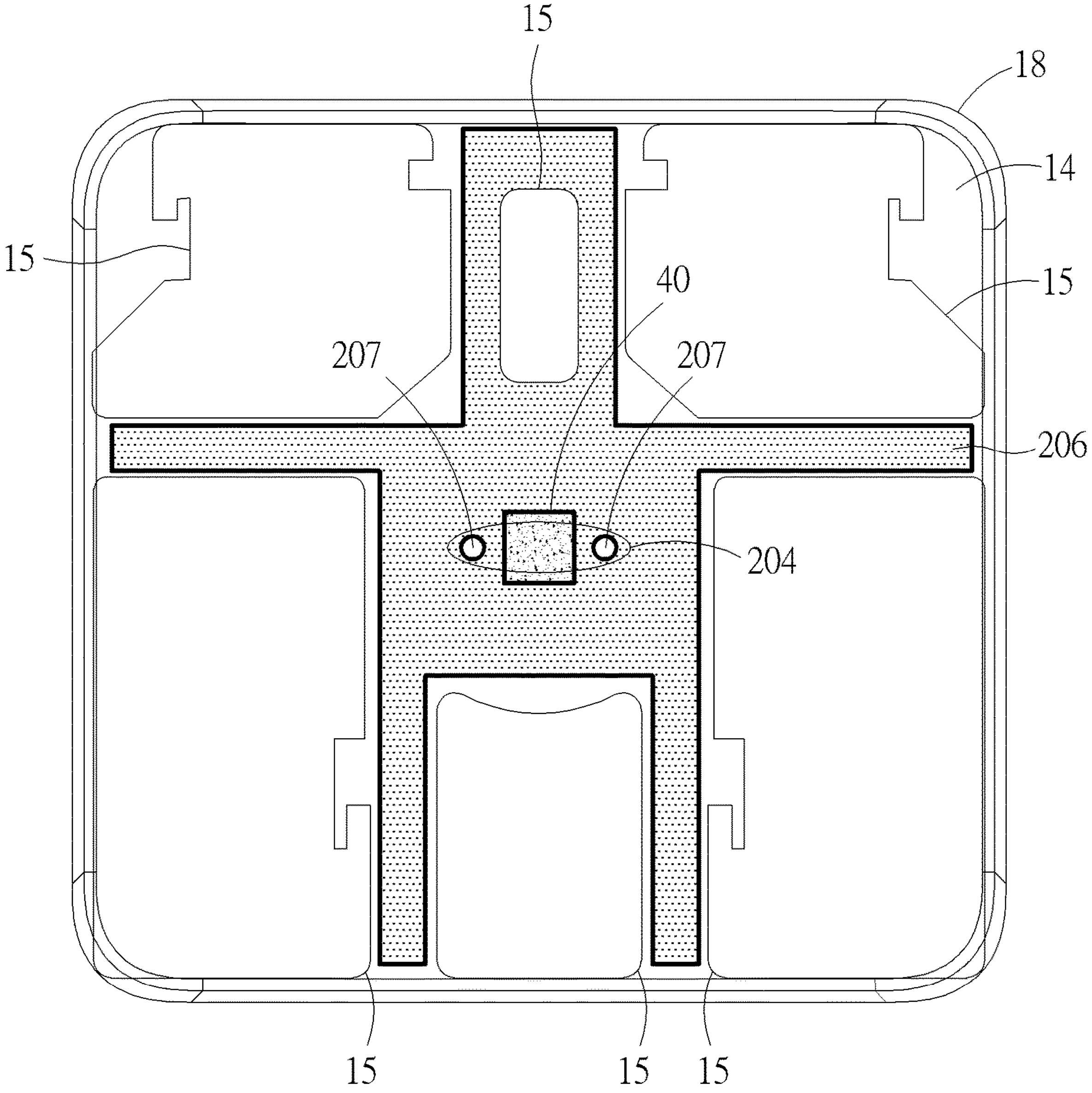
FIG. 6 is a top view of a keycap, a board, a first reflecting ink layer and an opaque ink layer in FIG. 5.

Moreover, please refer to FIG. 5 and FIG. 6. FIG. 6 is a top view of the keycap 20, the board 14, the first reflecting ink layer 206 and the opaque ink layer 40 in FIG. 5. As shown in FIG. 5 and FIG. 6, the first reflecting ink layer 206 could be further formed on the light-blocking sheet 30 corresponding to a region of the board 14 except the hole region 15 for improving the light usage efficiency of the backlight source 38 for the light guide plate 26. The coating configuration of the first reflecting ink layer 206 as shown in FIG. 6 is only for example, and the present invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight keyswitch comprising:
- a keyswitch body;
- a board disposed under the keyswitch body and connected to the keyswitch body to make the keyswitch body movable relative to the board, the board having at least one hole region corresponding to the keyswitch body;
- a membrane circuit board disposed between the keyswitch body and the board; and
- a backlight module disposed under the board, the backlight module comprising:
  - a light guide plate having a containing hole corresponding to the keyswitch body and having an optical microstructure corresponding to at least one hole region;
  - a backlight circuit board disposed under the light guide plate and having a backlight source disposed in the containing hole;
  - a light-blocking sheet disposed between the board and the light guide plate and having a light-permeable region corresponding to the keyswitch body;

a first reflecting ink layer formed on the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body; and an opaque ink layer, wherein the opaque ink layer is formed on the first reflecting ink layer formed on an upper surface of the light-blocking sheet, or the opaque ink layer and the first reflecting ink layer are formed on the upper surface and the lower surface of the light-blocking sheet respectively, for preventing light passing through the first reflecting ink layer from being incident to the keyswitch body.

2. The backlight keyswitch of claim 1, wherein the first reflecting ink layer is a white ink layer, and the opaque ink layer is a black ink layer.

3. The backlight keyswitch of claim 1, wherein the first reflecting ink layer has at least one light supplement hole, the board further has a center hole region, and the at least one light supplement hole is located on at least one side of the opaque ink layer to make the light emitted upward by the backlight source pass through at least one light supplement hole, the center hole region and the membrane circuit board to be incident to the keyswitch body.

4. The backlight keyswitch of claim 1, wherein the first reflecting ink layer is formed on the light-blocking sheet corresponding to a region of the board except the at least one hole region.

5. The backlight keyswitch of claim 1, wherein the first reflecting ink layer is a white ink layer.

6. The backlight keyswitch of claim 1, wherein the backlight module further comprising:

a second reflecting ink layer formed on the backlight circuit board for reflecting light emitted downward out of the light guide plate back to the light guide plate.

7. The backlight keyswitch of claim 6, wherein the first reflecting ink layer and the second reflecting ink layer are white ink layers.

8. The backlight keyswitch of claim 1, wherein the backlight module further comprises another opaque ink layer formed under the backlight circuit board for preventing light from passing through the backlight circuit board.

9. A backlight module applied to a backlight keyswitch, the backlight keyswitch having a keyswitch body, a board, and a membrane circuit board, the board being disposed under the keyswitch body and connected to the keyswitch body to make the keyswitch body movable relative to the board, the board having at least one hole region corresponding to the keyswitch body, the membrane circuit board being disposed between the keyswitch body and the board, the backlight module comprising:

a light guide plate having a containing hole corresponding to the keyswitch body and having an optical microstructure corresponding to at least one hole region;

a backlight circuit board disposed under the light guide plate and having a backlight source disposed in the containing hole;

a light-blocking sheet disposed between the board and the light guide plate and having a light-permeable region;

a first reflecting ink layer formed on the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body; and an opaque ink layer, wherein the opaque ink layer is formed on the first reflecting ink layer formed on an upper surface of the light-blocking sheet, or the opaque ink layer and the first reflecting ink layer are formed on the upper surface and the lower surface of the light-blocking sheet respectively, for preventing light passing through the first reflecting ink layer from being incident to the keyswitch body.

10. The backlight module of claim 9, wherein the first reflecting ink layer is a white ink layer, and the opaque ink layer is a black ink layer.

11. The backlight module of claim 9, wherein the first reflecting ink layer has at least one light supplement hole, the board further has a center hole region, and the at least one light supplement hole is located on at least one side of the opaque ink layer to make the light emitted upward by the backlight source pass through at least one light supplement hole and the center hole region to be incident to the keyswitch body.

12. The backlight module of claim 9, wherein the first reflecting ink layer is formed on the light-blocking sheet corresponding to a region of the board except the at least one hole region.

13. The backlight module of claim 9, wherein the first reflecting ink layer is a white ink layer.

14. The backlight module of claim 9, wherein the backlight module further comprising:

a second reflecting ink layer formed on the backlight circuit board for reflecting light emitted downward out of the light guide plate back to the light guide plate.

15. The backlight module of claim 14, wherein the first reflecting ink layer and the second reflecting ink layer are white ink layers.

16. The backlight module of claim 9, wherein the backlight module further comprises another opaque ink layer formed under the backlight circuit board for preventing light from passing through the backlight circuit board.

17. A backlight keyswitch comprising:

a keyswitch body;

a board disposed under the keyswitch body and connected to the keyswitch body to make the keyswitch body movable relative to the board, the board having at least one hole region corresponding to the keyswitch body;

a membrane circuit board disposed between the keyswitch body and the board; and a backlight module disposed under the board, the backlight module comprising:

a light guide plate having a containing hole corresponding to the keyswitch body and having an optical microstructure corresponding to at least one hole region;

a backlight circuit board disposed under the light guide plate and having a backlight source disposed in the containing hole;

a light-blocking sheet disposed between the board and the light guide plate and having a light-permeable region corresponding to the keyswitch body; and a first reflecting ink layer formed on a lower surface of the membrane circuit board and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body.

18. The backlight keyswitch of claim 17, wherein the first reflecting ink layer is a white ink layer.

19. The backlight keyswitch of claim 17, wherein the backlight module further comprises:

a second reflecting ink layer formed on the backlight circuit board for reflecting light emitted downward out of the light guide plate back to the light guide plate.

20. The backlight keyswitch of claim 19, wherein the first reflecting ink layer and the second reflecting ink layer are white ink layers.

21. The backlight keyswitch of claim 17, wherein the backlight module further comprises an opaque ink layer, and the opaque ink layer is formed under the backlight circuit board for preventing light from passing through the backlight circuit board.

22. A backlight module applied to a backlight keyswitch, the backlight keyswitch having a keyswitch body, a board, and a membrane circuit board, the board being disposed under the keyswitch body and connected to the keyswitch body to make the keyswitch body movable relative to the board, the board having at least one hole region corresponding to the keyswitch body, the membrane circuit board being disposed between the keyswitch body and the board, the backlight module comprising:

a light guide plate having a containing hole corresponding to the keyswitch body and having an optical microstructure corresponding to at least one hole region;

a backlight circuit board disposed under the light guide plate and having a backlight source disposed in the containing hole;

a light-blocking sheet disposed between the board and the light guide plate and having a light-permeable region; and a first reflecting ink layer formed on a lower surface of the membrane circuit board and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body.

23. The backlight module of claim 22, wherein the first reflecting ink layer is a white ink layer.

24. The backlight module of claim 22, wherein the backlight module further comprises:

a second reflecting ink layer formed on the backlight circuit board for reflecting light emitted downward out of the light guide plate back to the light guide plate.

25. The backlight module of claim 24, wherein the first reflecting ink layer and the second reflecting ink layer are white ink layers.

26. The backlight module of claim 22, wherein the backlight module further comprises an opaque ink layer, and the opaque ink layer is formed under the backlight circuit board for preventing light from passing through the backlight circuit board.

27. A backlight keyswitch comprising:

a keyswitch body;

a board disposed under the keyswitch body and connected to the keyswitch body to make the keyswitch body movable relative to the board, the board having at least one hole region corresponding to the keyswitch body;

a membrane circuit board disposed between the keyswitch body and the board; and a backlight module disposed under the board, the backlight module comprising:

a light guide plate having a containing hole corresponding to the keyswitch body and having an optical microstructure corresponding to at least one hole region;

a backlight circuit board disposed under the light guide plate and having a backlight source disposed in the containing hole;

a light-blocking sheet disposed between the board and the light guide plate and having a light-permeable region corresponding to the keyswitch body;

a first reflecting ink layer formed on one of the board, the membrane circuit board, and the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body; and an opaque ink layer formed under the backlight circuit board for preventing light from passing through the backlight circuit board.

28. The backlight keyswitch of claim 27, wherein the first reflecting ink layer is formed on the light-blocking sheet corresponding to a region of the board except the at least one hole region.

29. The backlight keyswitch of claim 27, wherein the first reflecting ink layer is formed on a lower surface of the board.

30. The backlight keyswitch of claim 27, wherein the first reflecting ink layer is a white ink layer.

31. The backlight keyswitch of claim 27, wherein the backlight module further comprises:

a second reflecting ink layer formed on the backlight circuit board for reflecting light emitted downward out of the light guide plate back to the light guide plate.

32. The backlight keyswitch of claim 31, wherein the first reflecting ink layer and the second reflecting ink layer are white ink layers.

33. A backlight module applied to a backlight keyswitch, the backlight keyswitch having a keyswitch body, a board, and a membrane circuit board, the board being disposed under the keyswitch body and connected to the keyswitch body to make the keyswitch body movable relative to the board, the board having at least one hole region corresponding to the keyswitch body, the membrane circuit board being disposed between the keyswitch body and the board, the backlight module comprising:

a light guide plate having a containing hole corresponding to the keyswitch body and having an optical microstructure corresponding to at least one hole region;

a backlight circuit board disposed under the light guide plate and having a backlight source disposed in the containing hole;

a light-blocking sheet disposed between the board and the light guide plate and having a light-permeable region;

a first reflecting ink layer formed on one of the board, the membrane circuit board, and the light-blocking sheet and located above the backlight source, for reflecting at least partial light emitted upward by the backlight source back to the optical microstructure, such that light can pass through the light-permeable region, the at least one hole region, and the membrane circuit board sequentially via scattering of the optical microstructure to be incident to the keyswitch body; and an opaque ink layer formed under the backlight circuit board for preventing light from passing through the backlight circuit board.

34. The backlight module of claim 33, wherein the first reflecting ink layer is formed on the light-blocking sheet corresponding to a region of the board except the at least one hole region.

35. The backlight module of claim 33, wherein the first reflecting ink layer is formed on a lower surface of the board.

36. The backlight module of claim 33, wherein the first reflecting ink layer is a white ink layer.

37. The backlight module of claim 33, wherein the backlight module further comprises:

a second reflecting ink layer formed on the backlight circuit board for reflecting light emitted downward out of the light guide plate back to the light guide plate.

38. The backlight module of claim 37, wherein the first reflecting ink layer and the second reflecting ink layer are white ink layers.

* * * * *